United States Patent
Georgeaux et al.

(10) Patent No.: US 10,568,088 B2
(45) Date of Patent: Feb. 18, 2020

(54) METHOD FOR ALLOCATING RADIO RESOURCES IN A TELECOMMUNICATIONS SYSTEM

(71) Applicant: AIRBUS DS SLC, Elancourt (FR)

(72) Inventors: Eric Georgeaux, Montigny le Bretonneux (FR); Philippe Mege, Bourg la Reine (FR); Laurent Martinod, Le Chesnay (FR); Hang Nguyen, Bretigny sur Orge (FR); Alina-Alexandra Florea, Guyancourt (FR)

(73) Assignee: AIRBUS DS SLC, Elancourt (FR)

( * ) Notice: Subject to any disclaimer, the term of this patent is extended or adjusted under 35 U.S.C. 154(b) by 372 days.

(21) Appl. No.: 15/129,109

(22) PCT Filed: Apr. 1, 2015

(86) PCT No.: PCT/FR2015/050852
§ 371 (c)(1),
(2) Date: Jun. 20, 2017

(87) PCT Pub. No.: WO2015/145093
PCT Pub. Date: Oct. 1, 2015

(65) Prior Publication Data
US 2017/0318579 A1    Nov. 2, 2017

(30) Foreign Application Priority Data
Mar. 27, 2014 (FR) ...................................... 14 00745

(51) Int. Cl.
*H04W 72/04* (2009.01)
*H04J 11/00* (2006.01)
(Continued)

(52) U.S. Cl.
CPC ....... *H04W 72/0446* (2013.01); *H04L 5/0007* (2013.01); *H04W 72/121* (2013.01);
(Continued)

(58) Field of Classification Search
CPC ........... H04W 72/0446; H04W 72/121; H04W 72/04; H04W 88/10; H04W 72/085; H04L 5/0007; H04L 9/08
See application file for complete search history.

(56) References Cited

U.S. PATENT DOCUMENTS

| | | | |
|---|---|---|---|
| 2010/0034388 A1* | 2/2010 | Nakano ................... | G06F 21/10 380/277 |
| 2010/0248638 A1* | 9/2010 | Harada ................ | H04J 11/0053 455/67.11 |

FOREIGN PATENT DOCUMENTS

WO   WO 2013/066125 A1   5/2013
WO   WO 2013/110212 A1   8/2013

OTHER PUBLICATIONS

International Search Report as issued in International Patent Application No. PCT/FR2015/050852, dated Jun. 1, 2015.

* cited by examiner

*Primary Examiner* — Kiet Tang
(74) *Attorney, Agent, or Firm* — Pillsbury Winthrop Shaw Pittman LLP

(57) ABSTRACT

A method allocates radio resources to a plurality of communications in a broadband telecommunication system, each communication being associated with at least one piece of user equipment, at least one of the communications being associated with a single piece of user equipment, the radio resources being distributed according to time and frequency between blocks of resources. The plurality of communications forms at least one group of communications and at least the same block of resources is allocated to the group of
(Continued)

communications in order to transmit the plurality of communications.

7 Claims, 2 Drawing Sheets

(51) Int. Cl.
*G06F 21/10* (2013.01)
*H04L 5/00* (2006.01)
*H04W 72/12* (2009.01)
*H04L 9/08* (2006.01)
*H04W 72/08* (2009.01)
*H04W 88/10* (2009.01)

(52) U.S. Cl.
CPC ............ *H04L 9/08* (2013.01); *H04W 72/085* (2013.01); *H04W 88/10* (2013.01)

METHOD FOR ALLOCATING RADIO
RESOURCES IN A TELECOMMUNICATIONS
SYSTEM

CROSS REFERENCE TO RELATED
APPLICATIONS

This application is the U.S. National Stage of PCT/FR2015/050852, filed Apr. 1, 2015, which in turn claims priority to French Patent Application No. 1400745 filed Mar. 27, 2014, the entire contents of all applications are incorporated herein by reference in their entireties.

TECHNICAL FIELD AND OBJECT OF THE
INVENTION

The present invention relates to the field of radio resources allocation in a telecommunications system and more particularly relates to a method for allocating radio resources in a wideband telecommunications system.

STATE OF THE ART

A wideband telecommunications system comprises in a known manner a network especially including base stations, connected to each other via intermediate elements such as routers or gateways, to which user equipment can connect to communicate via said network. A same communication can be intended for a plurality of user equipment (referred to as a "point-to-multipoint" communication) or for a single piece of user equipment (referred to as a "point-to-point" communication).

In a network of the Third-Generation Partnership Projection Long-Term Evolution (3GPP LTE) type, the radio interface used over the downward link to transmit an encoded modulated communication between a base station and a piece of user equipment is based on the Orthogonal Frequency Division Multiple Access (OFDMA) technology.

In this technology, the radio resources are time- and frequency-distributed into resource blocks (RBs). A resource block has a time-slot of 0.5 ms and a bandwidth of 180 kHz (12 frequency sub-carriers). A physical channel occupies a frequency band containing one or more resource blocks, the bandwidth of a physical channel being then a multiple of 180 kHz.

It is thus necessary to allocate at least one resource block for a given communication towards a piece of user equipment. In other words, the granularity of the allocation is in the order of the resource block. However, certain communications such as, for example, the voice-type communications, generate only a low data rate. In this case, the allocated resource block is not fully used in terms of bandwidth. The use of the system is therefore not optimised for the low rate data communications, which has major drawbacks, especially in terms of cost and sizing.

A known solution, developed as part of the 3GPP group "Multimedia Broadcast Multicast Service" (MBMS), enables a single identifier, referred to as the "Temporary Mobile Group Identifier" (TGMI) to be associated with a group of point-to-multipoint type communications carried on same common resource blocks, and a second identifier to be associated with each communication of said group of communications.

However, such a solution does not enable the radio resources to be optimised, nor one or more point-to-point type communications to be transmitted using one or more same common resource blocks.

Indeed, for a point-to-multipoint communication, the resource allocations are not modified as a function of the quality perceived by each of the user equipment since a same communication is intended for all the receiving user equipment, the most disadvantaged piece of user equipment determining the modulation and encoding to be applied to the communication. The radio resources are not therefore optimised in this solution, which is a drawback.

On the contrary, in the case of a point-to-point communication, it is desirable to modify the radio resources allocation in order to adapt the modulation and encoding so as to use the smallest amount possible of resources to ensure this communication and thus optimise the radio resources, which the current MBMS solution does not enable.

The aim of the present invention is to at least partly overcome these drawbacks in particular by providing a simple efficient method enabling an optimised use of the radio resource blocks in a wideband telecommunications system, for point-to-multipoint type communications as well as point-to-point type communications.

General Disclosure of the Invention

The object of the invention is first a method for allocating radio resources to a plurality of communications in a wideband telecommunications system, each communication being associated with at least one piece of user equipment, at least one of the communications being associated with a single piece of user equipment, said radio resources being time- and frequency-distributed into resource blocks, the method being noteworthy in that the plurality of communications forms at least one group of communications and in that at least one same resource block is allocated to said group of communications in order to transmit the plurality of communications.

A same communication can be intended for a single piece of user equipment (referred to as a "point-to-point" communication) or for a group of user equipment (referred to as a "point-to-multipoint" communication). However, at least one of the communications is associated with a single piece of user equipment. In other words, there is at least one point-to-point communication in the group of communications.

Furthermore, the plurality of communications can be distributed into a plurality of groups of communications, a same resource block being allocated to each group in order to transmit the communication or the communications which make it up.

The method according to the invention thus enables several communications to be grouped, at least one of which is a point-to-point communication, in a same resource block or in a same set of resource blocks without a block being allocated to one and only one communication. In other words, the plurality of communications is transmitted into one or more radio resource blocks as if it formed one and only one communication. This enables the bandwidth of each resource block to be fully and usefully used in order to increase the total bandwidth of the system and to reduce the cost thereof.

Preferably, the resource block or blocks are allocated to the group of communications based on at least one piece of information, received from at least one of the user equipment, about the quality of a communication in which said piece of user equipment is implied. The use of such a piece of information about the quality of the communication is particularly advantageous in the case of a point-to-point communication. Indeed, the modulation and encoding, and therefore the number of allocated resource blocks, for each communication, especially a point-to-point communication, are therefore adapted as a function of the quality of the downward link. To this end, the piece of information about the quality can be sent by the piece of the user equipment of the group of communications to the base station in a channel quality indicator (CQI) report type message in the 3GPP LTE terminology.

Thus, for example, according to the nature of the received quality piece of information, it can be decided whether to continue to use the resource block or blocks previously allocated to the group of communications or on the contrary to change the allocation of the resource block or blocks for the group of communications or even to divide the group of communications into at least a first sub-group of communications, to which at least one same first resource block is allocated, and into a second sub-group of communications, to which at least one same second resource block is allocated, each of these sub-groups being able to be completed by other communications that were not part of the initial group of communications. This mechanism makes it possible to carry out an adaptation of the transmission rate of the communications using the same resource block or blocks in order to increase the spectral efficiency of the system implementing the method.

Advantageously, the communications corresponding to a same channel quality indicator or to close channel quality indicators are grouped in a same group of communications in order to optimise the use of the radio resource blocks.

According to a characteristic of the invention, the method comprises a step of encrypting a communication intended for a piece of user equipment or for a given group of user equipment using a single encryption key. A single decryption key, associated with said encryption key, enables said communication to be decrypted, the encryption key and the associated decryption key being possibly identical.

In this case, the method can comprise a step of providing a single decryption key to each piece of user equipment and/or to each group of user equipment.

Advantageously, the resource block or blocks allocated to the group of communications are identified by a first identifier and the method comprises a step of sending said first identifier to each piece of user equipment implied in a communication of the group of communications.

Preferably, the first identifier is of the Radio Network Temporary Identifier (RNTI) type in the 3GPP LTE terminology.

According to an aspect of the invention, the method comprises a step of transmitting the group of communications to the plurality of user equipment over a radio link using the allocated resource block or blocks, and, for each piece of user equipment, the steps of:
 identifying from the first identifier, the resource block or blocks over which the group of communications is transmitted,
 receiving the group of communications transmitted over the identified resource block or blocks.

According to a characteristic of the invention, the method comprises a step of applying its decryption key to at least one communication of the received group of communications so as to decrypt it.

According to a first mode of implementing the method according to the invention, each piece of user equipment applies its decryption key to all the communications of the received group of communications. In this case, only the communication intended for said piece of user equipment is properly decrypted by said piece of user equipment, the other communications, which are not intended therefor, being nevertheless processed by the user equipment with its key to try to perform the decryption thereof but being not then decrypted.

According to a second mode of implementing the method according to the invention, each piece of user equipment receives a second identifier enabling, in the received group of communications, a communication intended therefor to be identified, identifies the communication intended therefor from the second identifier and applies its decryption key to said communication so as to decrypt it. This mode of implementation makes it possible to reduce the amount of decryption processing to be performed, and therefore the cost and complexity of the system, since only the communication which is intended for a given piece of user equipment is processed by said piece of user equipment with its key to perform the decryption thereof.

Advantageously, the resource block or blocks are allocated to the group of communications based on at least one piece of information referred to as "acknowledgment", received from at least one of the user equipment, of the reception and decryption of a communication intended for said piece of user equipment. The use of such an acknowledgment piece of information is particularly advantageous in the case of a point-to-point communication. This piece of information can be an ACK (acknowledgment) type or NACK (Negative-acknowledgment) type message in the 3GPP LTE terminology.

The invention also relates to a piece of user equipment of a telecommunications system configured to:
 identify, from a first identifier of at least one same resource block allocated to a group of communications comprising said communication, the resource block or blocks over which said group of communications is transmitted,
 receive said group of communications transmitted over the identified resource block or blocks,
 apply a decryption key to at least one communication of the received group of communications.

Preferably, the piece of user equipment is configured to receive and store a key of a communication intended for said piece of user equipment.

Still preferably, the piece of user equipment is configured to receive and store the first identifier.

In a first form of embodiment, the piece of user equipment is configured to apply the decryption key to all the communications of the received group of communications.

In a second form of embodiment, the piece of user equipment is configured to:
 receive a second identifier of a communication intended therefor,
 identify, from said received second identifier, a communication of the received group of communications,
 apply the decryption key to the identified communication.

According to an aspect of the invention, the user equipment is configured to send, preferably in a "CQI report" type message, at least one piece of information about the quality of a communication in which said piece of user equipment is implied.

According to a further aspect of the invention, the piece of user equipment is configured to send, preferably in an "ACK" or "NACK" type message, at least one piece of information referred to as "acknowledgment information" of the reception and the decryption of a communication intended for said piece of user equipment.

The invention also relates to a unit for allocating radio resources to a plurality of communications intended for a plurality of user equipment in a wideband telecommunications system, each communication being associated with at least one piece of user equipment, at least one of the communications being associated with a single piece of user equipment, said radio resources being time- and frequency-distributed into resource blocks, said unit being noteworthy in that, the plurality of communications forming a group of communications, it is configured to allocate at least one same resource block to said group of communications in order to transmit the plurality of communications.

Preferably, the unit for allocating resources comprises or is connected to an encrypting module configured to encrypt each communication of the plurality of communications with an encryption key.

According to an aspect of the invention, the unit for allocating resources is configured to allocate the resource block or blocks to the group of communications based on at least one piece of information, preferably received from at least one of the user equipment, about the quality of a communication in which said piece of user equipment is implied.

Thus, for example, according to the nature of the received quality information, the unit for allocating resources can decide whether to continue to use the resource block or blocks previously allocated to the group of communications or on the contrary to change the allocation of the resource block or blocks for the group of communications or even to divide the group of communications into at least a first sub-group of communications, to which at least a first resource block is allocated, and into a second sub-group of communications, to which at least a second resource block is allocated, each of these sub-groups being able to be completed by other communications that were not part of the initial group of communications.

According to an aspect of the invention, the unit for allocating radio resources is configured to allocate the resource block or blocks to the group of communications based on at least one piece of information referred to as "acknowledgement" information, received from at least one of the user equipment, of the reception and decryption of a communication intended for said piece of user equipment. The unit for allocating resources preferably receives all the acknowledgement information sent by the user equipment implied in the communications of the group of communications for which the unit for allocating resources allocates resource blocks.

The invention also relates to a base station configured to transmit a plurality of communications to a plurality of user equipment over a radio link using radio resources, said base station being noteworthy in that it comprises a unit for allocating said radio resources such as previously set forth.

Preferably, the base station comprises or is connected to an encrypting module configured to encrypt each communication of the plurality of communications with an encryption key before its transmission.

The invention further relates to a wideband telecommunications system comprising:
  a plurality of user equipment such as previously set forth,
  at least one unit for allocating radio resources such as previously set forth,
  at least one base station configured to transmit a plurality of communications to said plurality of user equipment over a radio link using the resources allocated by said unit for allocating radio resources.

The system preferably comprises a base station including a unit for allocating radio resources such as previously set forth.

The invention also relates to a data medium for a computer program including instructions for implementing the method according to the invention by a piece of user equipment when the program is executed by at least one processor.

Also, the invention relates to a data medium for a computer program including instructions for implementing the method according to the invention by a unit for allocating radio resources when the program is executed by at least one processor.

Further characteristics and advantages of the invention will appear from the following description made with respect to the accompanying figures given by way of non-limiting examples and in which identical references are given to similar objects.

DETAILED DESCRIPTION OF THE INVENTION

Description of a Form of Embodiment of the System According to the Invention

I. System 1

Figure 1:
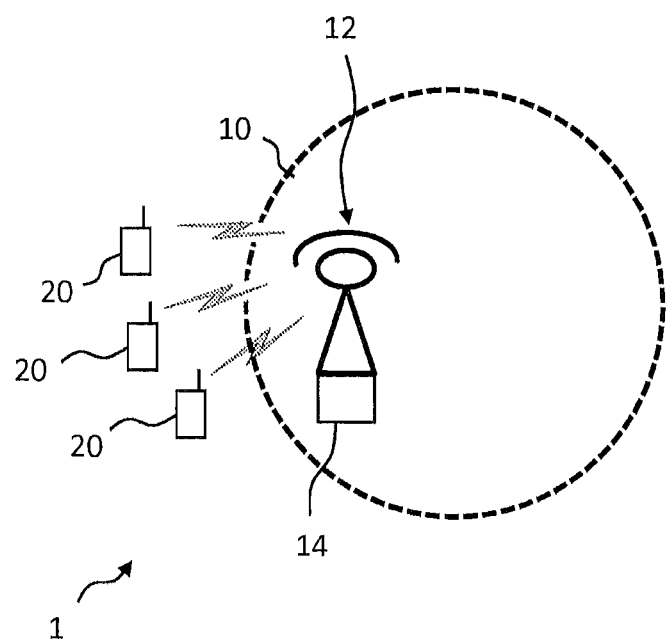
FIG. 1 schematically depicts a form of embodiment of the system according to the invention.

The wideband telecommunications system 1 illustrated in FIG. 1 comprises a telecommunications network 10 and a plurality of user equipment 20 connected to said network 10 via a base station 12.

A) Network 10

In the example described below, the telecommunications network 10 is a 3GPP LTE type network known from those skilled in the art. The invention however more generally applies to any type of wideband telecommunications network 10 the radio resources of which are defined as resource blocks and particularly to 3GPP LTE and LTE-advanced type networks.

The network 10 comprises a plurality of known elements such as base stations, servers, routers and gateways (not depicted) interconnected to each other so as to enable the user equipment 20 to receive communications from the network 10 and/or to send communications to the network 10, for example to communicate with other user equipment (not depicted) connected to the network 10.

For the sake of simplification and clarity, in FIG. 1 only one base station 12 is depicted, to which a plurality of user equipment 20 is connected.

The base station 12 enables the communication of the user equipment 20 with the network 10 over a radio link, for example of the orthogonal frequency division multiple access (OFDMA) type known from those skilled in the art.

In this example, the base station 12 comprises a unit 14 for allocating radio resources configured to allocate radio resources, time- and frequency-distributed into resource blocs, to a plurality of communications intended for the plurality of user equipment 20.

It will be noted that, in another form of embodiment of the system according to the invention, the unit for allocating radio resources 14 could be separated from the base station 12.

Each communication of the plurality of communications is either associated with a piece of user equipment 20

(point-to-point communication), or associated with a group of user equipment 20 (point to multipoint communication). However, at least one of the communications is associated with a single piece of user equipment. In other words, there is at least one point-to-point communication in the group of communications.

According to the invention, the plurality of communications forms a group of communications and the unit for allocating radio resources 14 is configured to allocate at least one same resource block, identified by a first identifier, to said group of communications in order to transmit said plurality of communications.

The terms "at least one same resource bloc" mean that one or more radio resource blocs are allocated to the group of communications so that the group of communications is seen as only one communication from the point of view of the radio resource management.

The first identifier is preferably of the radio network temporary identifier (RNTI) type in the 3GPP LTE terminology, without of course limiting the scope of the present invention.

To this end, each communication of the group of communications is encrypted beforehand with a single key, the encryption keys of the communications of the group being consequently different from one another. Each encryption key of a communication is associated with a single decryption key of said communication.

B) User Equipment 20

Each piece of user equipment 20 is first configured to:
receive, for example from the base station 12 and store a first identifier of one or more radio resource blocs allocated to a group of communications comprising a communication intended therefor,
receive and store a decryption key making possible the decryption of a communication transmitted by the base station 12 and intended therefor, said communication having been encrypted prior to its transmission by the base station 12 using the encryption key corresponding to said decryption key.

Each piece of user equipment 20 is also configured to:
identify, from said first identifier, the radio resource block or blocks over which the group of communications is transmitted,
receive said group of communications transmitted over the identified resource block or blocks,
apply its decryption key to at least one communication of the received group of communications.

In a first form of embodiment, the piece of user equipment 20 is configured to apply the stored decryption key to all the communications of the received group of communications.

In a second form of embodiment, the piece of user equipment 20 is configured to receive a second identifier of a communication intended therefor, identify, from said second received identifier, a communication of the received group of communications and apply the stored decryption key to the identified communication.

The piece of user equipment 20 is configured to send:
at least one piece of information about the quality of a communication in which said piece of user equipment is implied, preferably in a "CQI report" type message, and/or
at least one piece of information referred to as "acknowledgement information" of the reception and decryption of a communication intended for said piece of user equipment, preferably in an "ACK" or "NACK" type message.

II. Implementation of the Invention

In the example described below, a plurality of communications, forming a group of communications, must be transmitted by the base station 12 to the plurality of user equipment 20, each of the communications being intended for a piece of user equipment 20 or a group of user equipment 20.

To this end, the unit for allocating radio resources 14 first allocates, in a step E1, the radio resource block or blocks, identified by a first RNTI type identifier, over which the group of communications will be transmitted.

The base station 12 sends, in a step E2, the first identifier to the user equipment 20 recipients of the group of communications.

Before being transmitted in the group of communications, each communication is encrypted beforehand, in a step E3, using a single encryption key associated with a single decryption key.

Each decryption key of a communication is provided and stored beforehand by the piece of user equipment 20 recipient of said communication. Providing its decryption key to a piece of user equipment 20 can be performed only once or for each distinct communication intended therefor.

It will be noted that step E3 could occur before step E1 without limiting the scope of the present invention.

The base station 12 then transmits, in a step E4, the group of communications to the plurality of user equipment 20 over a radio link using the common resource bloc or blocs allocated by the unit for allocating resources 14 in step E1.

Each piece of user equipment 20:
identifies in a step E5a, from the first identifier, the resource block or blocks over which said group of communications is transmitted, and
receives, in a step E5b, said group of communications transmitted over the identified resource block or blocks.

In practice, the base station transmits the group of communications using the allocated resources in modulated signals. Upon receiving these signals, a piece of user equipment 20 demodulates said signals corresponding to the allocated resource block or blocks. To do so, signalling messages are sent in a manner known to those skilled in the art by the base station 12 on the downlink to describe the structure of the allocations for the different communications and "groups of communications" transmitted by the base station 12 using the facilities of this downlink, especially the facilities of the OFDMA structure in the case of the LTE system.

Each piece of user equipment 20 then applies its decryption key to at least one communication of the received group of communications.

According to a first mode of implementation of the method according to the invention, each piece of user equipment 20 applies its decryption key to all the communications of the received group of communications at a step E6. In practice, a piece of user equipment 20 applies its decryption key to all the data obtained after demodulation of the allocated resource block or blocks.

In this case, only one communication intended for a given user equipment 20 is properly decrypted by said piece of user equipment 20, the other communications, not intended therefor, being nevertheless processed by the piece of user equipment 20 with its key to try to perform the decryption but being then not properly decrypted.

According to a second mode of the implementation of the method according to the invention, each piece of user equipment 20 receives, at a step E7, a second identifier and then identifies in the received group of communications, from said second identifier, a communication intended therefor at a step E8. Such a second identifier can also be of the RNTI type.

Once said communication is identified, each piece of user equipment 20 then applies, at a step E9, its decryption key to said communication so as to decrypt it. In practice, a piece of user equipment 20 applies its decryption key to the sub-assembly, identified by the second identifier, of data obtained after demodulation of the allocated resource block or blocks.

This mode of implementation makes it possible to reduce the quantity of decryption processing to be performed, and therefore the cost and the complexity of the system, since only the communication intended for a given piece of user equipment 20 is processed by said piece of user equipment 20 to perform the decryption thereof.

In order to optimise the use of the radio resources, each piece of user equipment 20 sends, for example periodically in a "CQI report" type message, to the unit for allocating resources 14 a piece of information about the quality of the communication or communications it receives and/or decrypts either a confirmation message (ACK) or non-confirmation message (NACK) of reception and/or decryption of a communication intended therefor.

As a function of this information, received from the user equipment 20, for example at a step E0, the unit for allocating resources 14 can modify the allocation of the radio resource block or blocks so as to better distribute the communications over one or more blocks or to distribute the communications of the group of communications into sub-groups, thus enabling the radio resource allocation to be optimised.

It will be further noted that the present invention is not limited to the above-described examples and is likely to be submitted to numerous alternatives available for those skilled in the art. Especially, the waveband network 10 type, the number of user equipment 20, the first identifier type, the second identifier type, etc. cannot be construed as being limiting.

Figure 2:
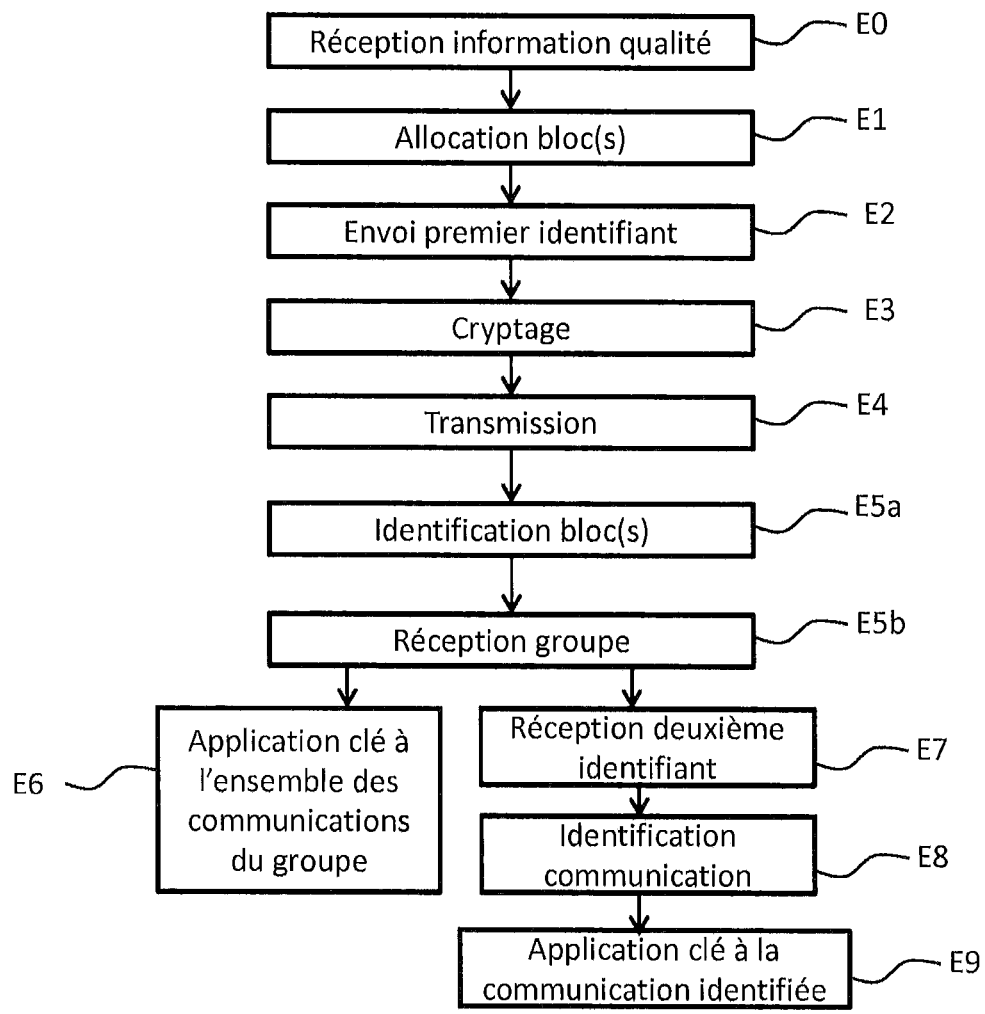
FIG. 2 illustrates a mode of implementation of the method according to the invention.

FIG. 2
E0 Receiving quality piece of information
E1 Allocating block or blocks
E2 Sending first identifier
E3 Encrypting
E4 Transmitting
E5a Identifying block or blocks
E5b Receiving group
E6 Applying key to all the communications of the group
E7 Receiving second identifier
E8 Identifying communication
E9 Applying key to the identified communication

The invention claimed is:

1. A method for allocating radio resources to a plurality of communications in a wideband telecommunications system, each communication being associated with at least one piece of user equipment, at least one of the communications being associated with a single piece of user equipment, said radio resources being time- and frequency-distributed into resource blocks, the plurality of communications forming at least one group of communications and at least one same resource block being allocated to said group of communications in order to transmit the plurality of communications, the method comprising:
allocating the resource block or blocks identified by a first identifier to the group of communications based on at least one piece of information, received from at least one of the user equipment, about the quality of a communication in which said piece of user equipment is involved,
encrypting said communication using a single encryption key with which a single decryption key is associated for enabling said communication to be decrypted,
sending said first identifier to each piece of user equipment involved in a communication of the group of communications,
transmitting the group of communications to the plurality of user equipment over a radio link using the allocated resource block or blocks and, for each piece of user equipment:
(i) identifying, from the first identifier, the resource block or blocks over which the group of communications is transmitted,
(ii) receiving the group of communications transmitted over the identified resource block or blocks, said group of communications including one or more communications not intended for said piece of user equipment, and
(iii) applying its decryption key to all the communications of the received group of communications so as to decrypt only a communication intended for the piece of user equipment without decrypting the one or more communications not intended for said piece of user equipment.

2. A piece of user equipment of a telecommunications system, the piece of user equipment comprising: a non-transitory machine readable medium including instructions executable by at least one processor for
identifying, from a first identifier of at least one same resource block allocated to a group of communications comprising said communication, the resource block or blocks over which said group of communications is transmitted,
receiving said group of communications transmitted over the identified resource block or blocks, said group of communications including one or more communications not intended for said piece of user equipment,
applying a decryption key to all the communications of the received group of communications so as to decrypt only a communication intended for the user equipment without decrypting the one or more communications not intended for said piece of user equipment, and
sending at least a piece of information on the quality of a communication in which said piece of user equipment is involved.

3. A unit for allocating radio resources to a plurality of communications intended for a plurality of user equipment in a wideband telecommunications system, each communication being associated with at least one piece of user equipment, at least one of the communications being associated with a single piece of user equipment, said radio resources being time- and frequency-distributed into resource blocks, the plurality of communications forming at least one group of communications, the unit comprising: a non-transitory machine readable medium including instructions executable by at least one processor
for allocating at least one same resource block to said group of communications in order to transmit the plurality of communications;
for allocating the resource block or blocks identified by a first identifier to the group of communications based on at least one piece of information, received from at least one of the user equipment, about the quality of a communication in which said piece of user equipment is involved;

for encrypting said communication using a single encryption key with which a single decryption key is associated for enabling said communication to be decrypted, for sending said first identifier to each piece of user equipment involved in a communication of the group of communications;

for transmitting the group of communications to the plurality of user equipment over a radio link using the allocated resource block or blocks and, for each piece of user equipment:

(i) identifying, from the first identifier, the resource block or blocks over which the group of communications is transmitted, (ii) receiving the group of communications transmitted over the identified resource block or blocks, said group of communications including one or more communications not intended for said piece of user equipment, and (iii) applying its decryption key to all the communications of the received group of communications so as to decrypt only a communication intended for the piece of user equipment without decrypting the one or more communications not intended for said piece of user equipment.

4. A base station configured to transmit a plurality of communications to a plurality of user equipment over a radio link using radio resources, said base station comprising a unit for allocating said radio resources according to claim 3.

5. A wideband telecommunications system comprising:
a plurality of user equipment according to claim 2,
at least one unit for allocating radio resources,
at least one base station configured to transmit a plurality of communications to said plurality of user equipment over a radio link using the resources allocated by said unit for allocating radio resources.

6. A non-transitory machine readable medium encoded with a computer program including instructions for implementing the method according to claim 1 by a piece of user equipment when the program is executed by at least one processor.

7. A non-transitory machine readable medium encoded with a computer program including instructions for implementing the method according to claim 1 by a unit for allocating radio resources when the program is executed by at least one processor.

* * * * *